US000001302H

United States Statutory Invention Registration [19]

[11] Reg. Number: H1302

George

[43] Published: Apr. 5, 1994

[54] POLYKETONE POLYMER BLENDS

[75] Inventor: Eric R. George, Houston, Tex.

[73] Assignee: Shell Oil Company, Houston, Tex.

[21] Appl. No.: 775,388

[22] Filed: Oct. 15, 1991

[51] Int. Cl.[5] ..... C08G 67/02; C08L 23/16

[52] U.S. Cl. ..... 525/185; 525/539; 525/933

[58] Field of Search ..... 525/185, 539, 933

[56] References Cited

U.S. PATENT DOCUMENTS

| | | | |
|---|---|---|---|
| 4,788,279 | 11/1988 | Drent | 528/392 |
| 4,818,786 | 4/1989 | Gergen et al. | 525/539 |
| 4,843,144 | 6/1989 | Van Broekhoven et al. | 528/392 |
| 4,874,819 | 10/1989 | George et al. | 525/185 |
| 4,880,903 | 11/1989 | Van Broekhoven et al. | 528/392 |
| 4,905,735 | 3/1990 | Akiyoshi | 428/36.8 |
| 5,071,916 | 12/1991 | Gergen et al. | 525/539 |

OTHER PUBLICATIONS

"Encyclopedia of Polymer Science and Technology", John Wiley & Sons, vol. 6 (1967) pp. 383–384.

*Primary Examiner*—Robert L. Stoll
*Assistant Examiner*—Joseph D. Anthony
*Attorney, Agent, or Firm*—James O. Okorafor

[57] ABSTRACT

Improved compositions comprise polymer blends of a linear alternating polymer of carbon monoxide and at least one ethylenically unsaturated hydrocarbon with an ethylene/propylene/non-conjugated diene terpolymer, and, optionally, an acidic polymer containing moieties of an $\alpha$-olefin and an $\alpha,\beta$-ethylenically unsaturated carboxylic acid. The blends demonstrate improved barrier properties.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYKETONE POLYMER BLENDS

FIELD OF THE INVENTION

This invention relates to polyketone blends, and, more particularly, to blends of a polyketone and ethylene/propylene/non-conjugated diene terpolymer.

BACKGROUND OF THE INVENTION

The polyketone polymers are relatively high molecular weight materials having established utility as premium thermoplastics in the production of shaped articles, such as containers for food and beverages, film for packaging, and flexible parts for automotive applications, which are produced by processing the polyketone polymer according to well known methods. For some particular applications, it is desirable to have properties which are somewhat different from those of the polyketone polymers. The more desirable properties of the polyketone polymers may be retained, and yet other properties improved, through the preparation of a polymer blend.

In order to improve the utility of polyketone polymers in food and beverage packaging and other applications, it would be desirable to improve the barrier properties of the polyketone polymer. It has been found that an ethylene/propylene/non-conjugated diene terpolymer may be blended with a polyketone polymer to produce blend compositions which exhibit improved barrier properties as well as a good balance of mechanical properties such that the blends have utility in food and beverage packaging applications.

SUMMARY OF THE INVENTION

The present invention provides blends of a linear alternating polyketone polymer of carbon monoxide and at least one ethylenically unsaturated hydrocarbon with an ethylene/propylene/non-conjugated diene terpolymer, also known as EPDM. More particularly, the invention provides a polyketone polymer blend containing from about 5 wt % to about 25 wt % EPDM, preferably from about 15 wt % to about 25 wt % EPDM, and most preferably about 20 wt % EPDM. The blends preferably include, as an optional third component, an acidic copolymer, most preferably a copolymer of ethylene and methacrylic acid. The optional acidic copolymer may be present at from about 2 wt % to about 10 wt %, and preferably at about 5 wt %, based on total blend composition. The polyketone blends exhibit a good balance of mechanical peroperties, as well as improved barrier properties, particularly water vapor barrier. The invention also includes a method for improving the barrier properties of a polyketone polymer through incorporating therein the EPDM and optional acidic polymer.

DESCRIPTION OF THE INVENTION

The polyketone polymers used in the blends of the invention are of a linear alternating structure and contain substantially one molecule of carbon monoxide for each molecule of unsaturated hydrocarbon. Suitable ethylenically unsaturated hydrocarbons for use as monomers in the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and misopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a monomer of ethylene for each unit incorporating a monomer of the second hydrocarbon. Preferably, there will be from about 10 units to about 100 units incorporating a monomer of ethylene for each unit incorporating a monomer of the second hydrocarbon. The polymer chain of the preferred polyketone polymers is therefore represented by the repeating formula $$\left[CO\left[CH_2-CH_2\right]\right]_x\left[CO\left[G\right]\right]_y$$

wherein G is the monomer of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the $-CO\left[CH_2CH_2\right]-$ units and the $-CO\left[G\right]-$ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of and the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

U.S. Pat. No. 4,880,903 (Van Broekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (Van Broekhoven et al.) discloses a process for preparing polymers of carbon monoxide and at least one ethylenically unsaturated hydrocarbon using a catalyst comprising a compound of palladium, the anion of a nonhydrohalogenic acid having a pKa of below about 6 and a bidentate ligand of phosphorus.

The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

The second component of the blends of the invention is an ethylene/propylene/non-conjugated diene terpolymer (EPDM). This terpolymer is primarily produced for use in elastomeric compositions. EPDM is characterized by the absence of unsaturation in the polymer backbone, while groups which are pendant to, or in cyclic structures outside of the polymer backbone, contain sites of unsaturation. The preparation of EPDM, using a Ziegler-Natta catalyst, is well known in the art. Vistalon TM 7000, a high ethylene content EPDM available from Exxon Chemical Company, is particularly useful in the subject invention.

The precise percentage of the EPDM to be employed in the blends of the invention will depend upon the anticipated end use for the blend. Compositions containing from about 5 wt % to about 25 wt % EPDM, based on total blend, are believed to be satisfactory, with from about 15 wt % to about 25 wt % being preferred, and about 20 wt % being most preferred.

The optional, third polymeric component of the blends of the invention, present as a minor component if present at all, is an acidic polymer containing moieties of an α-olefin and an α,β-ethylenically unsaturated carboxylic acid, optionally polymerized with a third monomer, and optionally having a portion of the carboxylic acid groups neutralized with non-alkali metal. The amount of the optional third component will suitably be up to about 10 wt % based on the total polymer blend. Amounts of the optional blend component up to about 5 wt % on the same basis are preferred.

The α-olefin monomer of this acidic polymer is an α-olefin of up to 10 carbon atoms inclusive such as ethylene, propylene, 1-butene, isobutylene, 1-octene and 1-decane. Preferred α-olefins are straight chain α-olefins of up to 4 carbon atoms inclusive and most preferred is ethylene. The α-olefin monomer of the acidic polymer is present in at least 65 mole % based on total blend component and is preferably present in at least 80 mole % on the same basis.

The ethylenically unsaturated carboxylic acid monomer is an α,β-ethylenically unsaturated carboxylic acid of up to 10 carbon atoms inclusive and is illustrated by acrylic acid, 2-hexenoic acid and 2-octenoic acid. The preferred α,β-ethylenically unsaturated carboxylic acids have up to 4 carbon atoms inclusive. These acids are acrylic acid, methacrylic acid and crotonic acid, of which acrylic acid and methacrylic acid are particularly preferred. The unsaturated carboxylic acid monomer is present in an amount from about 1 wt % to about 35 wt % based on total blend component, but amounts from about 5 mole % to about 20 mole % on the same basis are preferred.

The acidic polymer is suitably a copolymer of the α-olefin and the unsaturated carboxylic acid, and in general such copolymers are preferred. On occasion, however, it is useful to incorporate as a third monomer a non-acidic, low molecular weight polymerizable monomer of up to 8 carbon atoms inclusive. This third monomer may be another α-olefin such as propylene or styrene when the major α-olefin monomer is ethylene, an unsaturated ester such as vinyl acetate, methyl acrylate or ethyl methacrylate, an unsaturated halohydrocarbon such as vinyl fluoride or vinyl chloride, or an unsaturated nitrile such as acrylonitrile. As previously stated, the presence of this third monomer is optional and is not required. Amounts of the third monomer of up to about 5 mole %, based on total blend component, are satisfactory, with amounts of up to about 3 mole % on the same basis being preferred.

Independent of whether the acidic polymer is a copolymer or a terpolymer, in an optional embodiment a portion of the carboxylic acid groups is neutralized with non-alkali metal. When partially neutralized, the acidic polymer, although polymeric in form, exhibits ionic character and is conventionally referred to as a metal ionomer. In the partially neutralized embodiment, the acidic polymer is reacted with a source of ionizable zinc, aluminum, or magnesium compound sufficient to neutralize from about 10% to about 90%, preferably from about 20% to about 80%, of the carboxylic acid groups present in the polymer. Such neutralization results in a uniform distribution of the metal throughout the polymer.

The ionizable metal compound utilized in the neutralization is a source of complexed or uncomplexed non-alkali metal ions including zinc, aluminum, or magnesium ions. Such ions are provided by compounds of the type known as metal salts, e.g., uncomplexed metal ion salts such as zinc acetate, zinc chloride or zinc formate, or complexed metal ion salts in which the metal is bonded to two types of groups, at least one of which is readily ionizable. Illustrative of such complexed metal ion salts are mixed zinc salts with one weak acid such as oleic acid or stearic acid and one more ionizable acid such as acetic acid or formic acid. In general, neutralization with a complexed non-alkali metal ion is preferred.

The optionally partially neutralized acidic polymers employed as an optional polymeric blend component are broadly conventional and many are commercial. Copolymers of ethylene and methacrylic acid are marketed by DuPont under the trademark NUCREL® and copolymers of ethylene and acrylic acid are marketed by Dow under the trademark PRIMACORE®. Partially neutralized polymers are marketed by DuPont under the trademark SURLYN®.

The blends of the invention may also include additives such as antioxidants and stabilizers, dyes, fillers or reinforcing agents, fire resistant materials, mold release agents, colorants and other materials designed to improve the processability of the polymers or the properties of the resulting blend. Such additives are added prior to, together with or subsequent to the blending of the polyketone and the other components.

The method of producing the blends of the invention is not material so long as a uniform blend is produced without undue degradation of the blend or its components. In one modification the polymer components of the blend are extruded in a corotating twin screw extruder to produce the blend. In an alternate modification, the polymer components are blended in a mixing device which exhibits high shear. The blends are processed by methods such as extrusion and injection molding into sheets, films, plates and shaped parts. Illustrative of such applications are the production of articles useful in both rigid and flexible packaging applications. Specific applications include films, containers, and bottles, which may be made by thermoforming injection or extrusion blow molding, etc.

The invention is further illustrated by the following Examples which should not be regarded as limiting.

EXAMPLE 1

A linear alternating terpolymer of carbon monoxide, ethylene, and propylene (90/064) was produced in the presence of a catalyst composition formed from palladium acetate, trifluoroacetic acid and 1,3-bis[di(2methoxyphenyl)phosphino]propane. The polyketone polymer had a melting point of about 220° C. and an LVN of about 1.1 dl/g when measured in m-cresol at 60° C. The polyketone polymer also contained conventional additives.

EXAMPLE 2

Blends were prepared of the polyketone terpolymer of Example I and Vistalon 7000, a high ethylene-content EPDM, available from Exxon Chemical Company. The blends prepared are shown in Table 1. The blends were compounded on a Haake 30 mm corotating twin screw extruder, at a melt temperature of about 240° C. Subsequent to blending, specimens of the blends were molded into plaques on a 25 ton Arburg injection molding machine. Molded specimens were stored over desiccant until tested. Mechanical testing was performed on "dry as molded" specimens. Results of the mechanical testing are shown in Table 1.

Specimens of the blends were also molded into 7.5 oz. cups using a Krauss-Maffei 100-ton injection molding machine. The cups had an average wall thickness of about 25 mils. The cups were filled with water, double seamed with an aluminum lid, maintained in a 50% relative humidity environment, and weighed periodically to determine the water vapor transmission rate loss over time. Some of the samples were also subjected to a retort cycle in a Barnstead benchtop sterilization unit with 15 psi overpressure. The retort temperature was increased until the internal temperature reached 260° F., at which point the container was slowly cooled to 150° F. Water vapor transmission rate results are shown in Table 1.

The EPDM reduced the water vapor transmission rate of the unblended polyketone polymer. When present at 20 wt % in the polyketone polymer, the Vistalon 7000 reduced the WVTR to 5.3% weight loss/year before retort, and 7.0% weight loss/year after retort. The EPDM improved the flexibility of the polymer, as demonstrated by a reduction in the flexural modulus. Increased flexibility is useful both for packaging and for other applications. The EPDM reduced notched Izod values, and significantly reduced Gardner impact values.

Although the WVTR of the neat polyketone polymer was reduced with the addition of this EPDM, it would be desirable to obtain a reduction to 3% weight loss per year for packaging applications.

TABLE 1

| Blend Component | Composition (Polyketone/EPR) | Tensile Properties: Strength at Break (PSI) | Tensile Properties: Elongation at Break (%) | Flexural Modulus (PSI) | Notched Izod (ft-lb/in) Room Temperature | Gardner Impact (in-lb) Room Temperature | Water Vapor Transmission Rate (% wt loss/year) Before Retort | Water Vapor Transmission Rate (% wt loss/year) After Retort |
|---|---|---|---|---|---|---|---|---|
| — | 100/0 | 6790 | 87 | 259,000 | 1.71 | 42 | 8.0 | 12.0 |
| Vistalon 7000 | 95/5 | 7761 | 26 | 225,000 | 1.11 | 17 | 6.9 | 10.1 |
| Vistalon 7000 | 90/10 | 6640 | 26 | 196,000 | 1.16 | 16 | 6.8 | 9.7 |
| Vistalon 7000 | 80/20 | 5143 | 29 | 157,000 | 1.05 | 11 | 5.3 | 7.0 |

EXAMPLE 3

Blends were prepared of the polyketone terpolymer of Example 1 with Vistalon 7000, a high ethylene-content EPDM, and Nucrel, an ethylene/methylacrylic acid copolymer. The blends were prepared and tested as described in Example 2. The WVTR results are shown in Table 2.

The addition of Nucrel to the binary blend of polyketone and EPDM had a significant effect on the water vapor transmission rate, reducing it to 3% weight loss per year before retort in the sample containing 20 wt % Vistalon 7000 and 5 wt % Nucrel, while tensile properties were maintained at adequate levels.

TABLE 2

| Polyketone (wt %) | Vistalon 7000 (wt %) | Nucrel (wt %) | Tensile Properties: Strength at Break (PSI) | Tensile Properties: Elongation at Break (%) | Water Vapor Transmission Rate (% weight loss/year): Before Retort | Water Vapor Transmission Rate (% weight loss/year): After Retort |
|---|---|---|---|---|---|---|
| 100 | 0 | 0 | 6790 | 87 | 7.0 | 11.0 |
| 80 | 20 | 0 | 5143 | 29 | 5.3 | 7.0 |
| 78 | 20 | 2 | 5407 | 36 | 3.7 | 5.6 |
| 75 | 20 | 5 | 4760 | 28 | 3.0 | 4.5 |

What is claimed is:

1. A polymer composition comprising a major proportion of a linear alternating polyketone polymer and a lesser proportion of an ethylene/propylene/non-conjugated diene terpolymer.

2. The composition of claim I wherein the polyketone polymer is represented by the repeating formula $$\left[CO\left[CH_2-CH_2\right]\right]_x\left[CO\left[G\right]\right]_y$$

wherein G is a monomer of an ethylenically unsaturated hydrocarbon of at least 3 carbon atoms polymerized through the ethylenic unsaturation and the ratio of y:x is no more than about 0.5.

3. The composition of claim 2 wherein the ethylene/propylene/nonconjugated diene terpolymer is EPDM.

4. The composition of claim 3 wherein, in the polyketone polymer, G is a monomer of propylene and the ratio of y:x is from about 0.01 to about 0.1.

5. The composition of claim 3 wherein, in the polyketone polymer, y is zero.

6. The composition of claim 3 wherein the EPDM comprises from about 5 wt % to about 25 wt % of the total blend.

7. The composition of claim 3 wherein the EPDM comprises from about 15 wt % to about 25 wt % of the total blend.

8. The composition of claim 4 wherein the EPDM comprises about 20 wt % of the total blend.

9. The composition of claim 3 wherein the polymer blend composition includes, as an added component, from about 2 wt % to about 10 wt %, based on the total blend, of an acidic polymer incorporating moieties of an $\alpha,\beta$-ethylenically unsaturated carboxylic acid.

10. The composition of claim 9 wherein the acidic polymer is present at about 5 wt % and comprises a copolymer of ethylene and methacrylic acid.

11. A composition comprising a blend of:

a major proportion of a linar alternating polyketone polymer of carbon monoxide and at least one ethylenically unsaturated hydrocarbon, wherein the linear alternating polyketone polymer is represented by the repeating formula $$\left[CO\left[CH_2-CH_2\right]\right]_x\left[CO\left[G\right]\right]_y$$

wherein G is a monomer of an ethylenically unsaturated hydrocarbon of at least 3 carbon atoms polymerized through the ethylenic unsaturation and the ratio of y:x is no more than about 0.5;

from about 15 wt % to about 25 wt %, based on the total belnd, of EPDM; and about 5 wt %, based on the total blend, of an acidic copolymer of ethylene and methacrylic acid.

12. The composition of claim 11 wherein, in the polyketone polymer, y is zero.

13. The composition of claim 11 wherein the EPDM comprises about 20 wt % of the total blend.

14. The composition of claim 11 wherein the acidic copolymer is partially neutralized with a non-alkali metal.

15. A method for improving the barrier properties of a linear alternating polyketone polymer of carbon monoxide and at least one ethylenically unsaturated hydrocarbon by incorporating therein an effective amount of an ethylene/propylene/non-conjugated diene terpolymer.

16. The method of claim 15 wherein the polyketone polymer is of the repeating formula $$\left[CO\left[CH_2-CH_2\right]\right]_x\left[CO\left[G\right]\right]_y$$

wherein G is a monomer of an ethylenically unsaturated hydrocarbon of at least 3 carbon atoms polymerized through the ethylenic unsaturation, and the ratio of y:x is no more than about 0.5.

17. The method of claim 15 wherein the ethylene/propylene/non-conjugated diene terpolymer is EPDM.

18. The method of claim 15 wherein the method includes incorporating into the polyketone polymer from about 2 wt % to about 10 wt %, based on the total blend, of an acidic polymer incorporating moieties of $\alpha,\beta$-ethylenically unsaturated carboxylic acid.

19. The method of claim 18 wherein the acidic copolymer is partially neutralized with a non-alkali metal.

20. The method of claim 18 wherein the barrier property water vapor transmission rate is less than about 4 wt % loss/year before retort.

* * * * *